US006258209B1

(12) United States Patent
Stohrer et al.

(10) Patent No.: US 6,258,209 B1
(45) Date of Patent: Jul. 10, 2001

(54) MULTI-COMPONENT SYSTEM FOR MODIFYING, DEGRADING OR BLEACHING LIGNIN, LIGNIN-CONTAINING MATERIALS OR SIMILAR SUBSTANCES

(75) Inventors: Jürgen Stohrer, München; Hans-Peter Call, Übach-Palenberg; Johannes Freudenreich, München; Manfred Amann, Odelzhausen; Robert Müller, München, all of (DE)

(73) Assignee: Consortium für elektrochemische Industrie GmbH, München (DE)

( * ) Notice: Subject to any disclaimer, the term of this patent is extended or adjusted under 35 U.S.C. 154(b) by 0 days.

(21) Appl. No.: 08/906,524

(22) Filed: Aug. 5, 1997

(30) Foreign Application Priority Data

Aug. 13, 1996  (DE) ............................................... 196 32 623

(51) Int. Cl.[7] ............................. D21C 9/147; D21C 9/16; D21H 25/02
(52) U.S. Cl. ................................. 162/65; 162/72; 162/76; 162/78; 435/189; 435/190; 435/191; 435/192; 435/277; 435/278
(58) Field of Search .................................. 162/72, 65, 76, 162/78; 8/111; 435/277, 278, 189, 190, 191, 192

(56) References Cited

U.S. PATENT DOCUMENTS

| 4,828,983 | * | 5/1989 | McClune | 435/7 |
| 5,725,732 | * | 3/1998 | Cooper, III | 162/72 |

FOREIGN PATENT DOCUMENTS

| 94/29510 | * | 12/1994 | (WO) | 162/72 |

* cited by examiner

*Primary Examiner*—Steve Alvo
(74) *Attorney, Agent, or Firm*—Collard & Roe, P.C.

(57) ABSTRACT

Multi-component system for modifying, degrading or bleaching lignin, lignin-containing materials or similar substances, includes (a) if appropriate at least one oxidation catalyst; (b) at least one suitable oxidizing agent; and (c) at least one mediator, wherein the mediator is chosen from the group consisting of N-aryl-N-hydroxyamides.

2 Claims, No Drawings

MULTI-COMPONENT SYSTEM FOR MODIFYING, DEGRADING OR BLEACHING LIGNIN, LIGNIN-CONTAINING MATERIALS OR SIMILAR SUBSTANCES

BACKGROUND OF THE INVENTION

1. Field of the Invention

The present invention relates to a multi-component system for modifying, degrading or bleaching lignin, lignin-containing materials or similar substances and to processes for its use.

2. The Prior Art

The sulfate process and the sulfite process are mentioned as the processes currently used chiefly for pulp production. With both processes, pulp is produced by cooking and under pressure. The sulfate process operates with the addition of NaOH and $Na_2S$, while $Ca(HSO_3)_2+SO_2$ is used in the sulfite process.

All the processes have as the primary objective, removing of the lignin from the plant material, wood or annual plants used.

The lignin which, with the cellulose and the hemicellulose, makes up the main constituent of the plant material (stem or trunk) must be removed. Otherwise, it is not possible to produce papers which are non-yellowing and which can be subjected to high mechanical stress.

Wood pulp production processes operate with stone grinders (mechanical wood pulp) or with refiners (TMP), which defibrillate the wood by grinding after appropriate pretreatment (chemical, thermal or chemical-thermal).

These wood pulps still comprise most of the lignin. They are used primarily for the production of newspapers, illustrated journals and the like.

The possibilities of the use of enzymes for degradation of lignin have been researched for some years. The action mechanism of such lignolytic systems was clarified only a few years ago. Then it became possible to obtain adequate amounts of enzyme with the white rot fungus Phanerochaete chrysosporium under suitable growing conditions with additions of inductor. The previously unknown lignin peroxidases and manganese peroxidases were discovered by this research. Since Phanerochaete chrysosporium is a very effective degrader of lignin, attempts were made to isolate its enzymes and to use them in a suitable form for lignin degradation. However, this was not successful, since it was found that the enzymes lead above all to repolymerization of the lignin and not to degradation thereof.

Similar circumstances also apply to other lignolytic enzyme species, such as laccases, which degrade the lignin oxidatively with the aid of oxygen instead of hydrogen peroxide. It was found that similar processes occur in all cases. In fact, free radicals are formed which react with one another again and thus lead to polymerization.

There are thus currently only processes which operate with in vivo systems (fungus systems). The main key points of optimization experiments are so-called biopulping and biobleaching.

Biopulping is understood as meaning treatment of chopped wood chips with live fungus systems. There are 2 types of forms of application:

1. Pretreatment of chopped chips before refining or grinding in order to save energy during the production of wood pulps (for example TMP or mechanical wood pulp). One advantage is the improvement which usually exists in the mechanical properties of the pulp, but a disadvantage is the poorer final whiteness.

2. Pretreatment of chopped chips (softwood/hardwood) before cooking of the pulp (kraft process, sulfite process).

The objective is reduction in cooking chemicals, improvement in cooking capacity and extended cooking. Improved kappa reduction after cooking in comparison with cooking without pretreatment is also achieved as an advantage.

Disadvantages of these processes are clearly the long treatment times (several weeks), and above all the unsolved risk of contamination during treatment if sterilization of the chopped chips, which is uneconomical, is to be dispensed with.

Biobleaching likewise operates with in vivo systems. The cooked pulp (softwood/hardwood) is seeded with fungus before bleaching and is treated for days to weeks. Only after this long treatment time is a significant reduction in kappa number and increase in whiteness found. This renders the process uneconomical for implementation in the usual bleaching sequences.

Another application carried out usually with immobilized fungus systems is the treatment of waste waters from the manufacture of pulp, in particular bleaching waste waters. This treatment is for decolorization thereof and reduction of the AOX (reduction of chlorinated compounds in the waste water caused by chlorine or chlorine dioxide bleaching stages).

It is furthermore known to employ hemicellulases and also xylanases and mannanases as bleaching boosters.

These enzymes are said to act chiefly against the xylan which is reprecipitated after the cooking process and partly masks the residual lignin. Degradation thereof increases the accessibility of the lignin to the bleaching chemicals (above all chlorine dioxide) used in the subsequent bleaching sequences. The savings in bleaching chemicals demonstrated in the laboratory were confirmed to only a limited extent on a large scale. Thus, this type of enzyme can at best be classified as a bleaching additive.

Chelating substances (siderophors, such as ammonium oxalate) and biosurfactants are assumed to be a cofactor, alongside the lignolytic enzymes.

The Application PCT/EP87/00635 describes a system for removing lignin from material containing lignin-cellulose with simultaneous bleaching. This system operates with lignolytic enzymes from white rot fungi with the addition of reducing and oxidizing agents and phenolic compounds as mediators.

In DE 4,008,893 C2, mimic substances which simulate the active center (prosthetic group) of lignolytic enzymes are added in addition to the redox system. It was thus possible to achieve a considerable improvement in performance.

In the Application PCT/EP92/01086, a redox cascade with the aid of phenolic or non-phenolic aromatics coordinated in oxidation potential is employed as an additional improvement.

The limitation for use on a large industrial scale is the applicability at low pulp densities (up to not more than 4%) for all three processes. For the last two Applications the risk of leaching out of metals when using chelating compounds, can lead above all to destruction of the peroxide in the subsequent peroxide bleaching stages.

Processes in which the activity of peroxidase is promoted by means of so-called enhancer substances are known from the three publications WO 94/12619, WO 94/12620 and WO 94/12621.

The enhancer substances are characterized with the aid of their half-life in WO 94/12619.

According to WO 94/12620, enhancer substances are characterized by the formula A=N—N=B, in which A and B are each defined cyclic radicals.

According to WO 94/12620, enhancer substances are organic chemicals which contain at least two aromatic rings, at least one of which is substituted in each case by defined radicals.

All three publications relate to dye transfer inhibition and to the use of the particular enhancer substances, together with peroxidases, as a detergent additive or detergent composition in the detergent sector. A possible use for the treatment of lignin is referred to in the description of these WO Applications. However, the Applicants' own experiments with the substances disclosed completely in these publications have shown that they showed no activity as mediators. Thus, they did not increase the bleaching action of the peroxidases during treatment of lignin-containing materials.

WO 94/29510 describes a process for enzymatic delignification in which enzymes are employed together with mediators. Compounds having the structure NO—, NOH— or HRNOH are generally disclosed as mediators.

Of the mediators disclosed in WO 94/29510, 1-hydroxy-1H-benzotriazole (HBT) gives the best results in the delignification. However, HBT has various disadvantages: It is available only at high prices and not in adequate amounts.

It reacts under delignification conditions to give 1H-benzotriazole. This compound is relatively poorly degradable, and can represent considerable environmental pollution in larger quantities. It leads to damage to enzymes to a certain extent. Its rate of delignification is not at all that high.

SUMMARY OF THE INVENTION

It is an object of the present invention to provide systems for modifying, degrading or bleaching lignin, lignin-containing materials or similar substances, which systems have overcome the disadvantages mentioned above.

The present invention relates to a multi-component system for modifying, degrading or bleaching lignin, lignin-containing materials or similar substances comprising a. if appropriate at least one oxidation catalyst and b. at least one suitable oxidizing agent and c. at least one mediator, wherein the mediator is an N-aryl-N-hydroxyamide.

It has surprisingly been found that the novel multi component system with mediators selected from the class of the N-aryl-N-hydroxyamides does not have the drawbacks of the prior art multicomponent systems.

Mediators which are preferably employed in the multi-component system according to the invention are compounds of the general formula (I), (II) or (III)

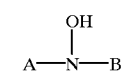
(I)

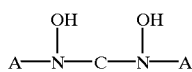
(II)

(III)

and salts, ethers or esters thereof, wherein

A is a monovalent homoaromatic or heteroaromatic mononuclear or dinuclear radical and D is a divalent homoaromatic or heteroaromatic mononuclear or dinuclear radical, and wherein these aromatics can be substituted by one or more identical or different radicals $R^1$ chosen from the group consisting of a halogen, hydroxyl, formyl, cyano, carbamoyl or carboxyl radical, an ester or salt of the carboxyl radical, a sulfono radical, an ester or salt of the sulfono radical, a sulfamoyl, nitro, nitroso, amino, phenyl, aryl-$C_1$–$C_5$-alkyl, $C_1$–$C_{12}$-alkyl, $C_1$–$C_5$-alkoxy, $C_1$–$C_{10}$-carbonyl, carbonyl-$C_1$–$C_6$-alkyl, phospho, phosphono or phosphono-oxy radical and an ester or salt of the phosphonooxy radical, and where carbamoyl, sulfamoyl, amino and phenyl radicals can be unsubstituted or monosubstituted or polysubstituted by a radical $R^2$ and the aryl-$C_1$–$C_5$-alkyl, $C_1$–$C_{12}$-alkyl, $C_1$–$C_5$-alkoxy, $C_1$–$C_{10}$-carbonyl and carbonyl-$C_1$–$C_6$-alkyl radicals can be saturated or unsaturated, branched or unbranched and can be monosubstituted or polysubstituted by a radical $R^2$, wherein $R^2$ is identical or different and is a hydroxyl, formyl, cyano or carboxyl radical, an ester or salt of the carboxyl radical or a carbamoyl, sulfono, sulfamoyl, nitro, nitroso, amino, phenyl, $C_1$–$C_5$-alkyl, $C_1$–$C_5$-alkoxy or $C_1$–$C_5$-alkylcarbonyl radical, and in each case two radicals $R^1$ or $R^2$ can be linked in pairs via a bridge [—$CR^3R^4$]$_m$, where m is 0, 1, 2, 3 or 4, and $R^3$ and $R^4$ are identical or different and are a carboxyl radical, an ester or salt of the carboxyl radical or a phenyl, $C_1$–$C_5$-alkyl, $C_1$–$C_5$-alkoxy or $C_1$–$C_5$-alkylcarbonyl radical, and one or more non-adjacent groups [—$CR^3R^4$—] can be replaced by oxygen, sulfur or an imino radical which is optionally substituted by a $C_1$ to $C_5$ alkyl radical, and two adjacent groups [—$CR^3R^4$—] can be replaced by a group [—$CR^3$=$CR^4$—] and B is a monovalent acid radical, present in amidic form, of acids chosen from the group consisting of a carboxylic acid having up to 20 carbon atoms, carbonic acid, a half-ester of carbonic acid or of carbamic acid, sulfonic acid, phosphonic acid, phosphoric acid, a monoester of phosphoric acid or a diester of phosphoric acid and C is a divalent acid radical, present in amidic form, of acids chosen from the group consisting of monocarboxylic and dicarboxylic acids having up to 20 carbon atoms, carbonic acid, sulfonic acid, phosphonic acid, phosphoric acid or a monoester of phosphoric acid.

Mediators which are particularly preferred in the multi-component system according to the invention are compounds of the general formula (IV), (V), (VI), (VII) or (VIII):

TABLE 1

Results of EXAMPLES 1 to 10

| Substance | Mediator dosage [mg/5 g of pulp] | Enzyme dosage [U/g of pulp] | Incubation time [hours] | Lignin degradation [%] |
|---|---|---|---|---|
| N-Hydroxyacetanilide | 56.5 | 15 | 2 | 28.9 |
| N-Benzoyl-N-phenylhydroxylamine | 80 | 15 | 2 | 24.8 |
| N-Hydroxy-3-oxo-butyroanilide | 72.5 | 15 | 2 | 16.1 |
| N-hydroxy-4-cyanoacetanilide | 66 | 15 | 2 | 35.6 |
| Phenyl N-hydroxy-N-phenylcarbamate | 86 | 15 | 2 | 20.0 |
| N-Hydroxy-N-phenylformamide | 51.5 | 15 | 2 | 22.2 |
| N-Hydroxy-N-phenyl-pivalamide | 72.5 | 15 | 2 | 19.6 |
| 1-Hydroxy-3,4-dihydroquinolin-2(1H)-one | 61.2 | 15 | 2 | 23.7 |
| N-Hydroxy-(2-methyl)-acetanilide | 60.1 | 15 | 2 | 34.0 |
| Ethyl 4-(N-acetyl-hydroxylamino)-benzoate | 83.7 | 15 | 2 | 40.0 | and salts, ethers or esters thereof, wherein $Ar^1$ is a monovalent homonuclear or heteroaromatic mononuclear aryl radical and $Ar^2$ is a divalent homoaromatic or heteroaromatic mononuclear aryl radical, which can be substituted by one or more identical or different radicals $R^7$ chosen from the group consisting of a hydroxyl, cyano or carboxyl radical, an ester or salt of the carboxyl radical, a sulfono radical, an ester or salt of the sulfono radical, or a nitro, nitroso, amino, $C_1$–$C_{12}$-alkyl, $C_1$–$C_5$-alkoxy, $C_1$–$C_{10}$-carbonyl or carbonyl-$C_1$–$C_6$-alkyl radical, where amino radicals can be unsubstituted or monosubstituted or polysubstituted by a radical $R^8$, and the $C_1$–$C_{12}$-alkyl, $C_1$–$C_5$-alkoxy, $C_1$–$C_{10}$-carbonyl and carbonyl-$C_1$–$C_6$-alkyl radicals can be saturated or unsaturated, branched or unbranched and can be monosubstituted or polysubstituted by a radical $R^8$, wherein $R^8$ is identical or different and is a hydroxyl or carboxyl radical, an ester or salt of the carboxyl radical or a sulfono, nitro, amino, $C_1$–$C_5$-alkyl, $C_1$–$C_5$-alkoxy or $C_1$–$C_5$-alkylcarbonyl radical, and in each case two radicals $R^7$ can be linked in pairs via a bridge $[-CR^3R^4]_m$, where m is 0, 1, 2, 3 or 4, and $R^3$ and $R^4$ have the meanings already given, and one or more non-adjacent groups $[-CR^3R^4-]$ can be replaced by oxygen, sulfur or an imino radical which is optionally substituted by a $C_1$ to $C_5$ alkyl radical, and two adjacent groups $[-CR^3R^4-]$ can be replaced by a group $[-CR^3=CR^4-]$, $R^5$ is identical or different monovalent radicals chosen from the group consisting of a hydrogen, phenyl, aryl-$C_1$–$C_5$-alkyl, $C_1$–$C_{12}$-alkyl, $C_1$–$C_5$-alkoxy or $C_1$–$C_{10}$-carbonyl radical, where phenyl radicals can be unsubstituted or monosubstituted or polysubstituted by a radical $R^9$ and the aryl-$C_1$–$C_5$-alkyl, $C_1$–$C_{12}$-alkyl, $C_1$–$C_5$-alkoxy and $C_1$–$C_{10}$-carbonyl radicals can be saturated or unsaturated, branched or unbranched, and can be monosubstituted or polysubstituted by a radical $R^9$, wherein $R^9$ is identical or different and is a hydroxyl, formyl, cyano or carboxyl radical, an ester or salt of the carboxyl radical, or a carbamoyl, sulfono, sulfamoyl, nitro, nitroso, amino, phenyl, $C_1$–$C_5$-alkyl or $C_1$–$C_5$-alkoxy radical and $R^6$ is divalent radicals chosen from the group consisting of an ortho-phenylene, meta-phenylene or para-phenylene, aryleno-$C_1$–$C_5$-alkyl, $C_1$–$C_{12}$-alkylene or $C_1$–$C_5$-alkylenedioxy radical, where phenyl radicals can be unsubstituted or monosubstituted or polysubstituted by a radical $R^9$ and the aryleno-$C_1$–$C_5$-alkyl, $C_1$–$C_{12}$-alkylene and $C_1$–$C_5$-alkylenedioxy radicals can be saturated or unsaturated, branched or unbranched and can be monosubstituted or polysubstituted by a radical $R^9$, wherein p is 0 or 1 and q is an integer from 1 to 3.

Preferably, $Ar^1$ is a phenyl radical and $Ar^2$ is an ortho-phenylene radical, where $Ar^1$ can be substituted by one to five and $Ar^2$ can be substituted by up to four identical or different radicals chosen from the group consisting of a $C_1$–$C_3$-alky-1, $C_1$–$C_3$-alkylcarbonyl or carboxyl radical, an ester or salt of the carboxyl radical, a sulfono radical, an ester or salt of the sulfono radical, and a hydroxyl, cyano, nitro, nitroso and amino radical, where amino radicals with two different radicals can be chosen from the group consisting of hydroxyl and $C_1$–$C_3$-alkylcarbonyl.

$R^5$ is preferably a monovalent radical chosen from the group consisting of a hydrogen, phenyl, $C_1$–$C_{12}$-alkyl or $C_1$–$C_5$-alkoxy radical, where the $C_1$–$C_{12}$-alkyl radicals and $C_1$–$C_5$-alkoxy radicals can be saturated or unsaturated and branched or unbranched.

$R^6$ is preferably a divalent radical chosen from the group consisting of an orthophenylene or paraphenylene, $C_1$–$C_{12}$-alkylene or $C_1$–$C_5$-alkylenedioxy radical, where the phenylene, $C_1$–$C_{12}$-alkyl and $C_1$–$C_5$-alkylenedioxy radicals can be saturated or unsaturated, branched or unbranched and can be monosubstituted or polysubstituted by a radical $R^9$.

$R^9$ is preferably a carboxyl radical, an ester or salt of the carboxyl radical or a carbamoyl, phenyl or $C_1$–$C_3$-alkoxy radical.

Examples of compounds which can be employed as mediators (component c) in the multi-component system according to the invention are N-hydroxyacetanilide, N-hydroxypivaloylanilide, N-hydroxyacrylanilide, N-hydroxybenzoylanilide, N-hydroxymethylsulfonylanilide, N-hydroxy-N-phenyl-methylcarbamate, N-hydroxy-3-oxo-butyrylanilide, N-hydroxy-4-cyanoacetanilide, N-hydroxy-4-methoxyacetanilide, N-hydroxyphenacetin, N-hydroxy-2,3-dimethylacetanilide, N-hydroxy-2-methylacetanilide, N-hydroxy-4-methylacetanilide, 1-hydroxy-3,4-dihydroquinolin-(1)-2-one, N,N'-dihydroxy-N,N'-diacetyl-1,3-phenylenediamine, N,N'-dihydroxysuccinic acid dianilide, N,N'-dihydroxy-maleic acid dianilide, N,N'-dihydroxy-oxalic acid dianilide, N,N'-dihydroxy-phosphoric acid dianilide, N-acetoxyacetanilide, N-hydroxymethyloxalylanilide and N-hydroxymaleic acid monoanilide.

Preferred mediators are N-hydroxyacetanilide, N-hydroxyformanilide, N-hydroxy-N-phenyl-methylcarbamate, N-hydroxy-2-methylacetanilide, N-hydroxy-4-methylacetanilide, 1-hydroxy-3,4-dihydroquinolin-(1H)-2-one and N-acetoxyacetanilide.

The multi-component system according to the invention comprises mediators which are cheaper than the mediators known from the prior art, in particular cheaper than HBT.

Furthermore, an increase in the rate of delignification is achieved when the mediators according to the invention are employed.

The multi-component system according to the invention preferably comprises at least one oxidation catalyst.

Enzymes are preferably employed as oxidation catalysts in the multi-component system according to the invention. In the context of the invention, the term enzyme also includes enzymatically active proteins or peptides or prosthetic groups of enzymes.

Enzymes which can be employed in the multi-component system according to the invention are oxidoreductases of classes 1.1.1 to 1.97 according to International Enzyme Nomenclature, Committee of the International Union of Biochemistry and Molecular Biology (Enzyme Nomenclature, Academic Press, Inc., 1992, pages 24–154).

The enzymes of the classes mentioned below are preferably employed:

Enzymes of class 1.1, which include all dehydrogenases which act on primary and secondary alcohols and semiacetals and have $NAD^+$ or $NADP^+$ (subclass 1.1.1), cytochromes (1.1.2), oxygen ($O_2$) (1.1.3), disulfides (1.1.4), quinones (1.1.5) as acceptors or have other acceptors (1.1.99).

Enzymes of this class which are particularly preferred are those of class 1.1.5 with quinones as acceptors and enzymes of class 1.1.3 with oxygen as the acceptor.

Cellobiose: quinone-1-oxidoreductase (1.1.5.1) is particularly preferred in this class.

Enzymes of class 1.2 are furthermore preferred. This enzyme class includes those enzymes which oxidize aldehydes to give the corresponding acids or oxo groups. The acceptors can be $NAD^+$, $NADP^+$ (1.2.1), cytochromes (1.2.2), oxygen (1.2.3), sulfides (1.2.4), iron/sulfur proteins (1.2.5) or other acceptors (1.2.99).

The enzymes of group (1.2.3) with oxygen as the acceptor are particularly preferred here.

Enzymes of class 1.3 are furthermore preferred.

This class comprises enzymes which act on CH—CH groups of the donor.

The corresponding acceptors are $NAD^+$, $NADP^+$ (1.3.1), cytochromes (1.3.2), oxygen (1.3.3), quinones or related compounds (1.3.5), iron/sulfur proteins (1.3.7) or other acceptors (1.3.99).

Bilirubin oxidase (1.3.3.5) is particularly preferred.

Here also, the enzymes of class (1.3.3) with oxygen as the acceptor and (1.3.5) with quinones and the like as the acceptor are particularly preferred.

Enzymes of class 1. 4 which act on CH—$NH_2$ groups of the donor are furthermore preferred.

The corresponding acceptors are $NAD^+$, $NADP^+$ (1.4.1), cytochromes (1.4.2), oxygen (1.4.3), disulfides (1.4.4), iron/sulfur proteins (1.4.7) or other acceptors (1.4.99).

Enzymes of class 1.4.3 with oxygen as the acceptor are also particularly preferred here.

Enzymes of class 1.5 which act on CH—NH groups of the donor are furthermore preferred. The corresponding acceptors are $NAD^+$, $NADP^+$ (1.5.1), oxygen (1.5.3), disulfides (1.5.4), quinones (1.5.5) or other acceptors (1.5.99).

Enzymes with oxygen ($O_2$) (1.5.3) and with quinones (1.5.5) as acceptors are also particularly preferred here.

Enzymes of class 1.6 which act on NADH or NADPH are furthermore preferred.

The acceptors here are $NADP^+$ (1.6.1), hemoproteins (1.6.2), disulfides (1.6.4), quinones (1.6.5), $NO_2$ groups (1.6.6) and a flavin (1.6.8), or some other acceptors (1.6.99).

Enzymes of class 1.6.5 with quinones as acceptors are particularly preferred here.

Enzymes which are furthermore preferred are those of class 1.7 which act on other $NO_2$ compounds as donors and have cytochromes (1.7.2), oxygen ($O_2$) (1.7.3), iron/sulfur proteins (1.7.7) or others (1.7.99) as acceptors.

Class 1.7.3 with oxygen as the acceptor is particularly preferred here.

Enzymes which are furthermore preferred are those of class 1.8 which act on sulfur groups as donors and have $NAD^+$, $NADP^+$ (1.8.1), cytochromes (1.8.2), oxygen ($O_2$) (1.8.3), disulfides (1.8.4), quinones (1.8.5), iron/sulfur proteins (1.8.7) or others (1.8.99) as acceptors.

Class 1.8.3 with oxygen ($O_2$) and (1.8.5) with quinones as acceptors is particularly preferred.

Enzymes which are furthermore preferred are those of class 1.9 which act on hemo groups as donors and have oxygen ($O_2$) (1.9.3), $NO_2$ compounds (1.9.6) and others (1.9.99) as acceptors.

Group 1.9.3 with oxygen ($O_2$) as the acceptor (cytochrome oxidases) is particularly preferred here.

Enzymes of class 1.12 which act on hydrogen as the donor are furthermore preferred.

The acceptors are $NAD^+$ or $NADP^+$ (1.12.1) or others (1.12.99).

Enzymes of class 1.13 and 1.14 (oxygenases) are furthermore preferred.

Enzymes which are furthermore preferred are those of class 1.15 which act on superoxide radicals as acceptors.

Superoxide dismutase (1.15.1.1) is particularly preferred here.

Enzymes of class 1.16 are furthermore preferred.

$NAD^+$ or $NADP^+$ (1.16.1) or oxygen ($O_2$) (1.16.3) act as acceptors.

Enzymes of class 1.16.3.1 (ferroxidase, for example ceruloplasmin) are particularly preferred here.

Enzymes which are furthermore preferred are those which belong to group 1.17 (action on $CH_2$ groups, which are oxidized to —CHOH—), 1.18 (action on reduced ferredoxin as the donor), 1.19 (action on reduced flavodoxin as the donor) and 1.97 (other oxidoreductases).

The enzymes of group 1.11 which act on a peroxide as the acceptor are furthermore particularly preferred. This sole subclass (1.11.1) contains the peroxidases.

Enzymes which are particularly preferred here are the cytochrome C peroxidases (1.11.1.5), catalase (1.11.1.6), peroxidase (1.11.1.6), iodide peroxidase (1.11.1.8), glutathione peroxidase (1.11.1.9), chloride peroxidase (1.11.1.10), L-ascorbate peroxidase (1.11.1.11), phospholipid hydroperoxide glutathione peroxidase (1.11.1.12), manganese peroxidase (1.12.1.13) and diarylpropane peroxidase (ligninase, lignin peroxidase) (1.11.1.14).

The enzymes of class 1.10 which act on biphenols and related compounds are especially preferred. They catalyze the oxidation of biphenols and ascorbates. $NAD^+$, $NADP^+$ (1.10.1), cytochromes (1.10.2), oxygen (1.10.3) or others (1.10.99) function as acceptors.

Enzymes of class 1.10.3 with oxygen ($O_2$) as the acceptor are in turn particularly preferred among these.

Particularly preferred enzymes of this class are the enzymes catechol oxidase (tyrosinase) (1.10.3.1), L-ascorbate oxidase (1.10.3.3), o-aminophenol oxidase (1.10.3.4) and laccase (benzenediol:oxygen oxidoreductase) (1.10.3.2), the laccases (benzenediol:oxygen oxidoreductase) (1.10.3.2) being particularly preferred.

The enzymes mentioned are commercially obtainable or can be obtained by standard processes. Possible organisms for production of the enzymes are, for example, plants, animal cells, bacteria and fungi. In principle, both naturally occurring organisms and organisms modified by genetic engineering can be producers of enzymes. Parts of one-cell or multicell organisms, above all cell cultures, are also conceivable as producers of enzymes.

White rot fungi, such as Pleurotus, Phlebia and Trametes, for example, are used for the particularly preferred enzymes, such as those from group 1.11.1, but above all 1.10.3, and in particular for the production of laccases.

The multi-component system according to the invention comprises at least one oxidizing agent. Oxidizing agents which can be employed are, for example, air, oxygen, ozone, $H_2O_2$, organic peroxides, peracids, such as peracetic acid, performic acid, persulfuric acid, pernitric acid, metachloroperoxybenzoic acid and perchloric acid, perborates, percarbomates, persulfates, peroxides or oxygen species and free radicals thereof, such as OH; OCH; singlet oxygen, superoxide ($O_2^-$), ozonide, the dioxygenyl cation ($O_2^+$), dioxirane, dioxetanes or Fremy radicals.

Those oxidizing agents which either can be generated by the corresponding oxidoreductases, for example dioxiranes from laccases plus carbonyls, or which can regenerate the mediator chemically or can react with the mediator directly are preferably employed.

The invention also relates to the use of substances which are suitable according to the invention as mediators for modifying, degrading or bleaching lignin, lignin-containing materials or similar substances.

The activity of the multi-component system for modifying, degrading or bleaching of lignin, lignin-containing materials or similar substances is often increased further if $Mg^{2+}$ ions are also present in addition to the constituents mentioned. The $Mg^{2+}$ ions can be employed, for example, as salt, such as, for example, $MgSO_4$. The concentration is in the range from 0.1 to 2 mg/g of lignin-containing material, preferably 0.2–0.6 mg/g.

In some cases, a further increase in the activity of the multi-component system according to the invention can be achieved by the multi-component system also comprising, in addition to the $Mg^{2+}$ ions, complexing agents, such as, for example, ethylenediaminetetraacetic acid (EDTA), diethylenetriaminepentaacetic acid (DTPA), hydroxyethylenediaminetriacetic acid (HEDTA), diethylenetriaminepentamethylenephosphonic acid (DTMPA), nitrilotriacetic acid (NTA), polyphosphoric acid (PPA) and the like. The concentration is in the range from 0.2 to 5 mg/g of lignin-containing material, preferably 1–3 mg/g.

The multi-component system according to the invention is used in a process for the treatment of lignin, for example, by mixing the components a) to c) selected in each case with an aqueous suspension of the lignin-containing material simultaneously or in any desired sequence.

A process using the multi-component system according to the invention in the presence of oxygen or air under normal pressure up to 10 bar in a pH range from 2 to 11 at a temperature from 20 to 95° C., preferably 40–95° C., and a pulp consistency of 0.5% to 40% by weight is preferably carried out. The pulp consistency percentage by weight is based upon the total weight of the system.

An unusual and surprising finding for the use of enzymes in bleaching pulp is that when the multi-component system according to the invention is employed, an increase in the pulp consistency causes a considerable increase in the kappa reduction that is possible.

A process according to the invention is preferably carried out at pulp consistencies of 8% to 35% by weight, particularly preferably 9% to 15% by weight, for economic reasons. The pulp consistency percentage by weight is based upon the total weight of the system.

Surprisingly, it has furthermore been found that an acid wash (pH 2 to 6, preferably 4 to 5) or Q stage (pH 2 to 6, preferably 4 to 5) before the enzyme mediator stage leads to a considerable reduction in kappa number in some pulps in comparison with treatment without this specific pretreatment. Chelating agents which are employed in the Q stage are the substances customary for this purpose (such as, for example, EDTA or DTPA). They are preferably employed in concentrations of 0.1% to 1% (w/w based on dry pulp), particularly preferably 0.1% to 0.5% (w/w based on dry pulp).

Preferably, 0.01 to 100,000 IU of enzyme per g of lignin-containing material are employed in the process according to the invention. Particularly preferably, 0.1 to 100, and especially preferably 1 to 40 IU of enzyme per g of lignin-containing material are employed (1 U corresponds to the conversion of 1 $\mu$mol of 2,2'-azino-bis(3-ethylbenzothiazoline-6-sulfonic acid diammonium salt) (ABTS)/ minute/ml of enzyme).

0.01 mg to 100 mg of oxidizing agent per g of lignin-containing material are preferably employed in the process according to the invention. 0.01 to 50 mg of oxidizing agent per g of lignin-containing material are particularly preferably employed.

0.5 to 80 mg of mediator per g of lignin-containing material are preferably employed in the process according to the invention. 0.5 to 40 mg of mediator per g of lignin-containing material are particularly preferably employed.

At the same time, reducing agents which, together with the oxidizing agents present, serve to establish a particular redox potential, can be added.

Reducing agents which can be employed are sodium bisulfite, sodium dithionite, ascorbic acid, thio compounds, mercapto compounds or glutathione and the like.

The reaction proceeds with the addition of air or oxygen or under an increased oxygen or air pressure in the case of laccase, and with hydrogen peroxide in the case of the peroxidases (for example lignin peroxidases or manganese peroxidases). The oxygen can also be generated here in situ, for example, by hydrogen peroxide+catalase, and the hydrogen peroxide can be generated in situ by glucose+GOD or other systems.

Agents which form free radicals or agents which trap free radicals (trapping of, for example, OH or OOH radicals) can furthermore be added to the system. These can improve the interaction between the redox and free radical mediators.

Other metal salts can also be added to the reaction solution.

These are important, in interaction with chelating agents, as agents which form free radicals or redox centers. The salts form cations in the reaction solution. Such ions are, inter alia, $Fe^{2+}$, $Fe^{3+}$, $Mn^{2+}$, $Mn^{3+}$, $Mn^{4+}$, $Cu^{2+}$, $Ca^{2+}$, $Ti^{3+}$, $Cer^{4+}$ and $Al^{3+}$.

The chelates present in the solution can furthermore serve as mimic substances for the enzymes, for example for the laccases (copper complexes) or for the lignin peroxidases or manganese peroxidases (hemocomplexes). Mimic substances are to be understood as those substances which simulate the prosthetic groups of (in this case) oxidoreductases and can catalyze, for example, oxidation reactions.

NaOCl can furthermore be added to the reaction mixture. This compound can form singlet oxygen by interaction with hydrogen peroxide.

Finally, it is also possible to operate with the use of detergents. Possible detergents are nonionic, anionic, cationic and amphoteric surfactants. The detergents can improve the penetration of the enzymes and mediators in the fiber.

It may likewise be necessary for the reaction to add polysaccharides and/or proteins. Polysaccharides which are to be mentioned here in particular are glucans, mannans, dextrans, levans, pectins, alginates or plant gums and/or intrinsic polysaccharides formed by the fungi or polysaccharides produced in the mixed culture with yeasts, and proteins which may be mentioned here in particular are gelatins and albumin.

These substances chiefly serve as protective colloids for the enzymes.

Other proteins which can be added are proteases, such as pepsin, bromelin, papain and the like. These can serve, inter alia, to achieve better access to the lignin by degradation of the extensin C, a hydroxyproline-rich protein, present in wood.

Other possible protective colloids are aminoacids, simple sugars, oligomeric sugars, PEG types of the most diverse molecular weights, polyethylene oxides, polyethyleneimines and polydimethylsiloxanes.

The process according to the invention can be employed not only for delignification (bleaching) of sulfate, sulfite, organosol or other pulps and of wood pulps. The process of the invention can also be used for the production of pulps generally, whether from woody or annual plants, when defibrillation is by the customary cooking processes (possibly combined with mechanical processes or pressure). Thus, very gentle cooking to kappa numbers which can be in the range of about 50–120 kappa, is ensured.

For bleaching of pulps and also for the production of pulps, the treatment can be repeated several times, either after washing and extraction of the treated pulp with NaOH or without these intermediate steps. This leads to kappa values which can be reduced considerably further still and to considerable increases in whiteness. An $O_2$ stage can likewise be employed before the enzyme/mediator treatment, or, as has already been mentioned, an acid washing or Q stage (chelating stage) can also be carried out.

Other objects and features of the present invention will become apparent from the following Examples, which disclose the embodiments of the present invention. It should be understood, however, that the Examples are designed for the purpose of illustration only and not as a definition of the limits of the invention.

DETAILED DESCRIPTION OF PREFERRED EMBODIMENTS

EXAMPLE 1

Enzymatic Bleaching with N-hydroxyacetanilide and Softwood Sulfate Pulp 5 g of bone-dry pulp (softwood $O_2$ delignified), pulp consistency 30% (about 17 g moist) are added to the following solutions:

A) 56.5 mg of N-hydroxyacetanilide are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 $\mu$mol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 $\mu$m) and extracted for 1 hour at 60° C. at a pulp consistency of 2% with 8% of NaOH per g of pulp.

After renewed washing of the pulp, the kappa number is determined. See Table 1 for the result.

EXAMPLE 2

Enzymatic Bleaching with N-benzoyl-N-phenylhydroxylamine and Softwood Sulfate Pulp 5 g of bone-dry pulp (softwood $O_2$ delignified), pulp consistency 30% (about 17 g moist) are added to the following solutions:

A) 80 mg of N-benzoyl-N-phenylhydroxylamine are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 $\mu$mol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 $\mu$m) and extracted for 1 hour at 60° C. at a pulp consistency of 2% with 8% of NaOH per g of pulp.

After renewed washing of the pulp, the kappa number is determined. See Table 1 for the result.

EXAMPLE 3

Enzymatic Bleaching with N-hydroxy-3-oxobutyranilide and Softwood Sulfate Pulp 5 g of bone-dry pulp (softwood $O_2$ delignified), pulp consistency 30% (about 17 g moist) are added to the following solutions:

A) 72.5 mg of N-hydroxy-3-oxobutyranilide are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 $\mu$mol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon sieve (30 μm) and extracted for 1 hour at 60° C. at a pulp consistency of 2% with 8% of NaOH per g of pulp.

After renewed washing of the pulp, the kappa number is determined. See Table 1 for the result.

EXAMPLE 4

Enzymatic Bleaching with N-hydroxy-4-cyanoacetanilide and Softwood Sulfate Pulp 5 g of bone-dry pulp (softwood $O_2$ delignified), pulp consistency 30% (about 17 g moist) are added to the following solutions:

A) 66 mg of N-hydroxy-4-cyanoacetanilide are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 μmol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 μm) and extracted for 1 hour at 60° C. at a pulp consistency of 2% with 8% of NaOH per g of pulp.

After renewed washing of the pulp, the kappa number is determined. See Table 1 for the result.

EXAMPLE 5

Enzymatic Bleaching with Phenyl N-hydroxy-N-phenylcarbamate and Softwood Sulfate Pulp 5 g of bone-dry pulp (softwood $O_2$ delignified), pulp consistency 30% (about 17 g moist) are added to the following solutions:

A) 86 mg of phenyl N-hydroxy-N-phenylcarbamate are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 μmol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 μm) and extracted for 1 hour at 60° C. at a pulp consistency of 2% with 8% of NaOH per g of pulp.

After renewed washing of the pulp, the kappa number is determined. See Table 1 for the result.

EXAMPLE 6

Enzymatic Bleaching with N-hydroxy-N-phenylformamide and Softwood Sulfate Pulp 5 g of bone-dry pulp (softwood $O_2$ delignified), pulp consistency 30% (about 17 g moist) are added to the following solutions:

A) 51.5 mg of N-hydroxy-N-phenylformamide are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 μmol of ABTS/minutes/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 μm) and extracted for 1 hour at 60° C. at a pulp consistency of 2% with 8% of NaOH per g of pulp.

After renewed washing of the pulp, the kappa number is determined. See Table 1 for the result.

EXAMPLE 7

Enzymatic Bleaching with N-hydroxy-N-phenyl-pivalamide and Softwood Sulfate Pulp 5 g of bone-dry pulp (softwood $O_2$ delignified), pulp consistency 30% (about 17 g moist) are added to the following solutions:

A) 72.5 mg of N-hydroxy-N-phenyl-pivalamide are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 μmol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 μm) and extracted for 1 hour at 60° C. at a pulp consistency of 2% with 8% of NaOH per g of pulp.

After renewed washing of the pulp, the kappa number is determined. See Table 1 for the result.

EXAMPLE 8

Enzymatic Bleaching with 1-hydroxy-3,4-dihydroquinolin-2(1H)-one and Softwood Sulfate Pulp 5 g of bone-dry pulp (softwood $O_2$ delignified), pulp consistency 30% (about 17 g moist) are added to the following solutions:

A) 61.2 mg of 1-hydroxy-3,4-dihydroquinolin-2(1H)-one are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 μmol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 μm) and extracted for 1 hour at 60° C. at a pulp consistency of 2% with 8% of NaOH per g of pulp.

After renewed washing of the pulp, the kappa number is determined. See Table 1 for the result.

EXAMPLE 9

Enzymatic Bleaching with N-hydroxy-(2-methyl)-acetanilide and Softwood Sulfate Pulp 5 g of bone-dry pulp (softwood $O_2$ delignified), pulp consistency 30% (about 17 g moist) are added to the following solutions:

A) 60.1 mg of N-hydroxy-(2-methyl)-acetanilide are added to 20 ml of tap water, while stirring, and the pH is adjusted with 0.5 mol/l of $H_2SO_4$ solution such that pH 4.5 results after addition of the pulp and the enzyme.

B) An amount of laccase from Trametes versicolor is added to 5 ml of tap water such that an activity of 15 U (1 U=conversion of 1 μmol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 μm) and extracted for 1 hour at 60° C. at a pulp consistency of 2% with 8% of NaOH per g of pulp.

After renewed washing of the pulp, the kappa number is determined. See Table 1 for the result.

EXAMPLE 10

Enzymatic Bleaching with ethyl 4-(N-acetyl-hydroxylamino)-benzoate and Softwood Sulfate Pulp 5 g of bone-dry pulp (softwood $O_2$ delignified), pulp consistency 30% (about 17 g moist) are added to the following solutions:

A) 83.7 mg of ethyl 4-(N-acetyl-hydroxylamino)-benzoate are added to 20 ml of tap water, while stirring, and the pH is adjusted with 0.5 mol/l of $H_2SO_4$ solution such that pH 4.5 results after addition of the pulp and the enzyme.

An amount of laccase from Trametes versicolor is added to 5 ml tap water such that an activity of 15 U (1 U=conversion of 1 μmol of ABTS/minute/ml of enzyme) per g of pulp results.

Solutions A and B are brought together and topped up to 33 ml. After addition of the pulp, the mixture is mixed with a dough kneader for 2 minutes.

The pulp is then introduced into a reaction bomb preheated to 45° C. and incubated under an increased oxygen pressure of 1–10 bar for 1–4 hours.

Thereafter, the pulp is washed over a nylon screen (30 μm) and extracted for 1 hour at 60° C. at a pulp consistency of 2% with 8% of NaOH per g of pulp.

After renewed washing of the pulp, the kappa number is determined. See Table 1 for the result.

TABLE 1

Results of EXAMPLES 1 to 10

| Substance | Mediator dosage [mg/5 g of pulp] | Enzyme dosage [U/g of pulp] | Incubation time [hours] | Lignin degradation [%] |
|---|---|---|---|---|
| N-Hydroxyacetanilide | 56.5 | 15 | 2 | 28.9 |
| N-Benzoyl-N-phenylhydroxylamine | 80 | 15 | 2 | 24.8 |
| N-Hydroxy-3-oxo-butyroanilide | 72.5 | 15 | 2 | 16.1 |
| N-hydroxy-4-cyanoacetanilide | 66 | 15 | 2 | 35.6 |
| Phenyl N-hydroxy-N-phenylcarbamate | 86 | 15 | 2 | 20.0 |
| N-Hydroxy-N-phenylformamide | 51.5 | 15 | 2 | 22.2 |
| N-Hydroxy-N-phenyl-pivalamide | 72.5 | 15 | 2 | 19.6 |
| 1-Hydroxy-3,4-dihydroquinolin-2(1H)-one | 61.2 | 15 | 2 | 23.7 |
| N-Hydroxy-(2-methyl)-acetanilide | 60.1 | 15 | 2 | 34.0 |
| Ethyl 4-(N-acetyl-hydroxylamino)-benzoate | 83.7 | 15 | 2 | 40.0 |

B) An amount of laccase from Trametes versicolor is added to 5 ml of tap water such that an activity of 15 U (1 U=conversion of 1 μmol of ABTS/minute/ml of enzyme) per g of pulp results.

Solutions A and B are brought together and topped up to 33 ml. After addition of the pulp, the mixture is mixed with a dough kneader for 2 minutes.

While several embodiments of the present invention have been shown and described, it is to be understood that many changes and modifications may be made thereunto without departing from the spirit and scope of the invention as defined in the appended claims.

What is claimed is:

1. A multi-component system for modifying, degrading or bleaching lignin, or lignin-containing materials, comprising (a) at least one oxidation catalyst which is enzyme laccase;
(b) at least one oxidizing agent;
(c) at least one mediator, wherein the mediator is N-hydroxyacetanilide; and
(d) in combination with a substance selected from the group consisting of lignin and lignin-containing materials.

2. A multi-component system as claimed in claim 1, wherein the at least one oxidizing agent of (b) is selected from the group consisting of air, oxygen, ozone, $H_2O_2$, peracetic acid, performic acid, persulfuric acid, pernitric acid, metachloroperoxybenzoic acid, and perchloric acid.

* * * * *